US005551664A

United States Patent [19]

Böke

[11] Patent Number: 5,551,664

[45] Date of Patent: Sep. 3, 1996

[54] PILOT CONTROLLED VALVE FOR MOTOR VEHICLE TANK SYSTEMS

[75] Inventor: Harald Böke, Kalldorf, Germany

[73] Assignee: Burkert Werke GmbH & Co., Germany

[21] Appl. No.: 305,313

[22] Filed: Sep. 15, 1994

[30] Foreign Application Priority Data

Sep. 16, 1993 [DE] Germany .......................... 43 31 568.2

[51] Int. Cl.[6] .................................................... F16K 31/12

[52] U.S. Cl. ............................ 251/30.03; 251/44; 251/55

[58] Field of Search ............................ 251/43, 44, 30.01, 251/30.03, 55, 30.02

[56] References Cited

U.S. PATENT DOCUMENTS

| | | | |
|---|---|---|---|
| 1,511,009 | 10/1924 | Spear | 251/43 |
| 2,958,503 | 11/1960 | Vaughn | 251/30.02 |
| 3,206,158 | 9/1965 | Bloomquist | 251/43 |
| 3,738,607 | 6/1973 | Peruglia | 251/30.03 |
| 3,860,073 | 1/1975 | Willms | 251/43 |
| 3,957,244 | 5/1976 | Chauvigne . | |
| 4,332,368 | 6/1982 | Woloszczuk | 251/43 |
| 4,450,863 | 5/1984 | Brown | 251/30.03 |
| 4,930,665 | 6/1990 | Devine . | |
| 4,934,565 | 6/1990 | Helsey et al. . | |

FOREIGN PATENT DOCUMENTS

| | | |
|---|---|---|
| 2250059 | 5/1975 | France . |
| 2527195 | 11/1983 | France . |
| 1208960 | 1/1966 | Germany . |
| 1271477 | 6/1968 | Germany . |
| 2438590 | 2/1976 | Germany . |
| 3209689 | 9/1983 | Germany . |
| 3412545 | 10/1985 | Germany . |

*Primary Examiner*—A. Michael Chambers
*Attorney, Agent, or Firm*—Sixbey, Friedman, Leedom & Ferguson, P.C.; Gerald J. Ferguson, Jr.; Tim L. Brackett, Jr.

[57] ABSTRACT

A pilot controlled valve for motor vehicle tank systems whose valve body consists of two parts (10, 12). In the first housing part (10) an inlet duct (14), an outlet duct (16), an annular valve seat (20) and an annular duct (18) surrounding the latter are formed. A valve closure member (24) is urged by a compression spring (26) into engagement with the valve seat (20) and on a side thereof remote from the valve seat defines a pressure equalizing space (22), which is formed in the second housing part and connects a pressure equalizing duct (52) with the inlet duct (14). By means of a pilot valve (30, 32) a flow path (42) between the pressure equalizing space (22) and the outlet duct (16) is controlled. In the pressure equalizing duct (52) a check valve (54, 56) is arranged adapted to shut in the direction of flow from the pressure equalizing space (22) to the inlet duct (14). This means that the valve is counter pressure resistant.

16 Claims, 4 Drawing Sheets

PILOT CONTROLLED VALVE FOR MOTOR VEHICLE TANK SYSTEMS

The invention relates to a pilot controlled valve for tank systems for motor vehicles, comprising a valve body, in which an inlet duct, an outlet duct, an annular valve seat and an annular duct surrounding the latter are formed, a valve closure member, which is urged by a compression spring toward engagement with the valve seat and on a side thereof turned away from the valve seat defines a pressure equalizing space connected by at least one pressure equalizing duct with the inlet duct to provide a flow connection, and at least one pilot valve, by which a flow path between the pressure equalizing space and the outlet duct may be controlled.

In the case of such a valve the valve closure member, generally in the form of a valve plate, is acted upon on either side by the same liquid pressure and is solely urged by the force of the compression spring bearing on it against the valve seat. The valve is consequently not counter pressure resistant: Should on the outlet duct side the liquid pressure, for whatever reason, significantly exceed the pressure in the pressure equalizing space so that the force of the spring is overcome, the valve member will be moved clear of the valve seat so that fuel will be able to flow back toward the inlet duct. Since however owing to state regulations applying for motor vehicle tank systems accurate metering must be ensured, it is necessary to take steps to prevent such counter flow of the fuel. Accordingly motor vehicle tank systems are additionally fitted with a check valve preventing counter flow of metered fuel. Since however fuel is contained between the check valve and the metering valve and which may expand, for instance under the heat of the sun, in the check valve an excess pressure valve is integrated opening toward the metering valve as soon as a predetermined fluid pressure is exceeded.

One object of the invention is to prevent counter flow of the metered fuel through the pilot controlled valve even without the presence of a check valve in the flow path of the metered fuel.

In order to achieve such aim in the case of a pilot controlled valve of the type initially mentioned in the pressure equalizing duct a check valve is arranged which shuts off the duct in the flow direction from the pressure equalizing space to the inlet duct.

In the case of the valve in accordance of the invention there is an equalization of the liquid pressure between the two sides of the valve closure member only in the flow direction from the inlet duct to the outlet duct. In the opposite direction of flow the pressure equalizing duct, which is responsible for pressure equalization, is closed by the check valve. This measure means that the pilot controlled valve provides an effective sealing action against counter pressure so that a separate check valve is unnecessary.

A particularly simple design is produced if in accordance with an advantageous form of the invention the pressure equalizing duct extends through the valve closure member and hence the check valve may be arranged on the valve closure member as well.

Fuel is contained in the pilot controlled valve in accordance with the invention as well when the valve is in the shut condition. In order for thermal expansion of the included fuel to take place without jeopardy, in accordance with a preferred embodiment of the invention an excess pressure valve is arranged in the valve body and opens the flow connection to the inlet duct, if on the outlet side, delimited by the valve closure member, of the valve, there is a pressure which exceeds the pressure present on the inlet side by a predetermined amount.

In accordance with a particularly simple arrangement of the excess pressure valve such valve is arranged in a relief duct, which branches from the pilot valve controlled flow path and leads to the inlet duct.

In the valve in accordance with the invention the valve closure member may be designed in the form of a valve plate or a diaphragm. Designs are possible with an incident flow directed against the valve seat or over it. Furthermore designs can be produced with metering in two steps (coarse and fine metering) or furthermore in a stepless manner. In accordance with a particularly advantageous embodiment stepless metering is achieved using only one pilot valve, which is designed in the form of a stepless proportional solenoid valve.

Further designs are to be more particularly emphasized in which the incident flow is against the valve seat, that is to say the annular chamber is connected with the outlet duct, since in such designs all necessary control holes and ducts may be arranged with a pressure equalizing space in one of two housing parts, which serve to make up the valve member.

Further advantageous developments and convenient forms of the invention will be understood from the following detailed descriptive disclosure of embodiments thereof in conjunction with the accompanying drawings.

Figure 1:
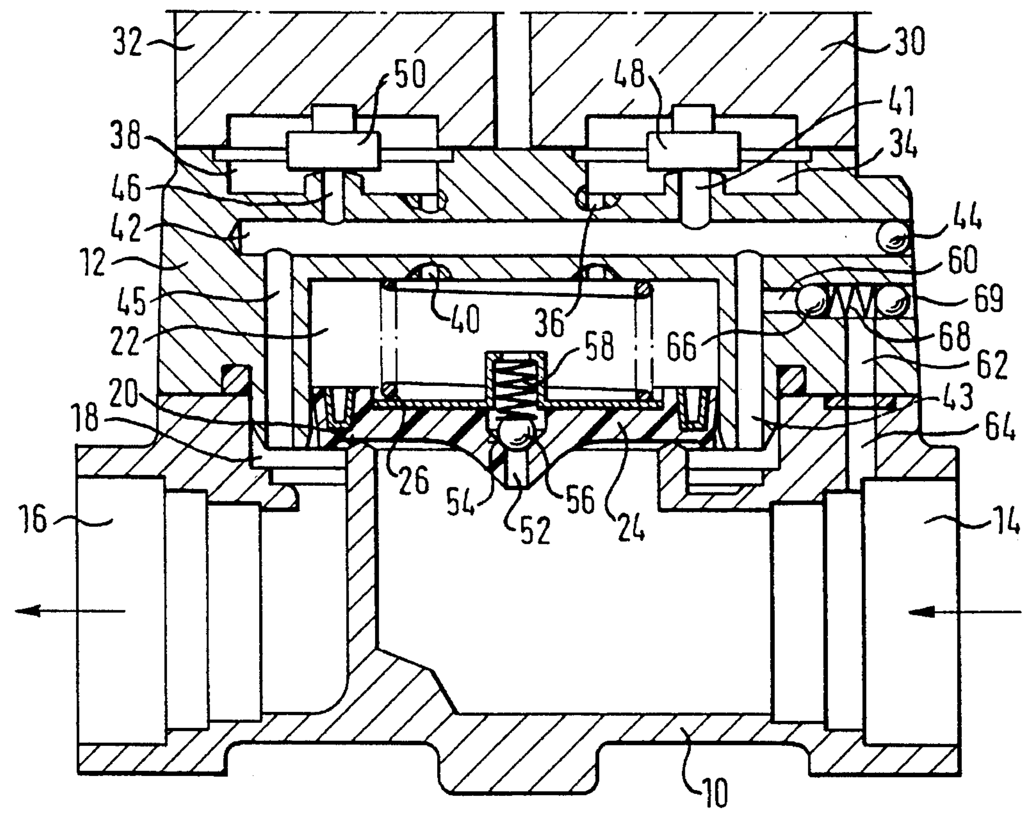
FIG. 1 is a sectional view of a first embodiment of the valve.

In the case of the embodiment of the pilot controlled valve for motor vehicle tank systems depicted in FIG. 1 two united housing parts 10 and 12 constitute a valve body. In the housing part 10 an inlet duct 14, an outlet duct 16 and an annular duct 18 in communication therewith are formed. The annular duct 18 surrounds an annular valve seat 20, at which the inlet duct 14 opens.

In the housing part 12 a cylindrical pressure equalizing space 22 is formed. In this pressure equalizing space 22 a closure member 24, designed in the form of a valve plate, is accommodated like an axially sliding piston provided with a circumferential seal. A compression spring 26 has its ends bearing against the closure member 24 and the limiting wall surface, opposite to the same, of the pressure equalizing space 22. The presence of this compression spring 26 means that the closure member 24 is urged against the valve seat 20.

The valve is designed for metering in two steps and is provided with two pilot valves 30 and 32. The valve space 34 of the pilot valve 30 is connected by a hole 36 with the pressure equalizing space 22. The valve space 38 of the pilot valve 32 is connected by a hole 40 with the pressure equalizing space 22. Furthermore the valve space 34 of the pilot valve 30 is connected by a control hole 41, surrounded by a valve seat, with a first section of a control duct 42, which extends in the portion, adjacent to the pilot valves 30 and 32, of the housing part 12 and towards the outside of the housing part 12 is shut off by a pressed-in ball 44 and is connected with two further duct sections 43 and 45, arranged at a right angle to the first section of the said control duct 42, such sections 43 and 45 opening into the annular duct 18. Furthermore via a control hole 46 the valve space 38, of the pilot valve 32, is connected with the control duct 42. The control hole 46 has a smaller cross section than the control hole 41. The control hole 46 as well forms a valve seat on its side facing away from the control duct 42. For cooperation with the associated valve seat each pilot valve 30 and 32 possesses a valve member 48 or, respectively, 50, which is operated by a solenoid (not illustrated).

A pressure equalizing duct 52 extends coaxially through the closure member 20 and connects the inlet duct 14 with the pressure equalizing space 22. The pressure equalizing duct 52 is surrounded at its end facing the pressure equalizing space 22 by an annular valve seat 54, against which a valve ball 56 is held engaged by a compression spring 58. It is in this manner that a check valve is constituted, which permits flow through the pressure equalizing duct 52 only in the flow direction from the inlet duct 14 into the pressure equalizing space 22.

From the control duct 42 a relief duct 60 branches off which consists of two mutually perpendicular duct sections, of which one, placed on the control duct 42 side is provided with an excess pressure valve and the other duct section, referenced 62, is aligned with a hole 64 in the adjacent wall of the housing part 10 and opens into the inlet duct 14. The excess pressure valve is constituted by a valve ball 66, which is urged by a compression spring 68 against a valve seat in the relief duct 60. The compression spring 68 has its end, which is remote from the valve ball 66, bearing against a ball 70, which is pressed into the relief duct 60 and shuts the same off from the outside.

The liquid fuel conveyed by a pump (not illustrated) of the motor vehicle tank system flows through the inlet duct 14 into the valve member overriding the force of the compression spring 58 so that the valve ball 56 comes clear of the valve seat 54 and the fuel passes through the pressure equalizing duct 52 into the pressure equalizing space 22. The valve closure member 24 is for this reason acted upon on both sides by the liquid pressure, but on the pressure equalizing space 22 side additionally by the compression spring 26. Accordingly the closure member 24 is held in engagement with the valve seat 20. The valve is shut.

By means of a switch in the fuel pump nozzle (not illustrated) of the motor vehicle tank system the solenoid of the pilot valve 30 is actuated. The valve member 48 is lifted from the associated valve seat so that now there is a flow path from the pressure equalizing space 22 through the duct 36, the valve space 34, the control hole 41 and the control duct 42 to the outlet duct 16. The pilot valve 30 controls flow through such flow path. Since the fuel is now able to flow from the pressure equalizing chamber 42 to the outlet duct 16, the closure member 24 is relieved on its pressure equalizing space side so that now the liquid pressure is greater on the opposite side thereof and the closure member 24 is lifted clear of the valve seat 20. The fuel will now flow through the inlet duct 14 via the valve seat 20 and into the annular space 18, whence it flows to the outlet duct 16.

The pilot valve 32 operates with a finer metering action than the pilot valve 30 but in principle in the same manner so that a separate description of its operation is not called for.

Should for some reason or other the liquid pressure be higher in the outlet duct 16 than in the inlet duct 14, the liquid pressure in the pressure equalizing space 22 will assume the same higher value and the valve ball 56 will be moved with the support of the compression spring 58 against its valve seat 54 in order to close the pressure equalizing duct 52. The closure member 24 is hence held in engagement with its valve seat 20. The valve is therefore counter pressure resistant.

If heating, for instance by solar radiation, of the fuel included in the valve member leads to a high gage pressure, such pressure will take effect on the valve ball 66 until the compression spring 68 will yield at a predetermined excess or gage pressure and will open the relief duct 60 to the inlet duct 14.

Figure 2:
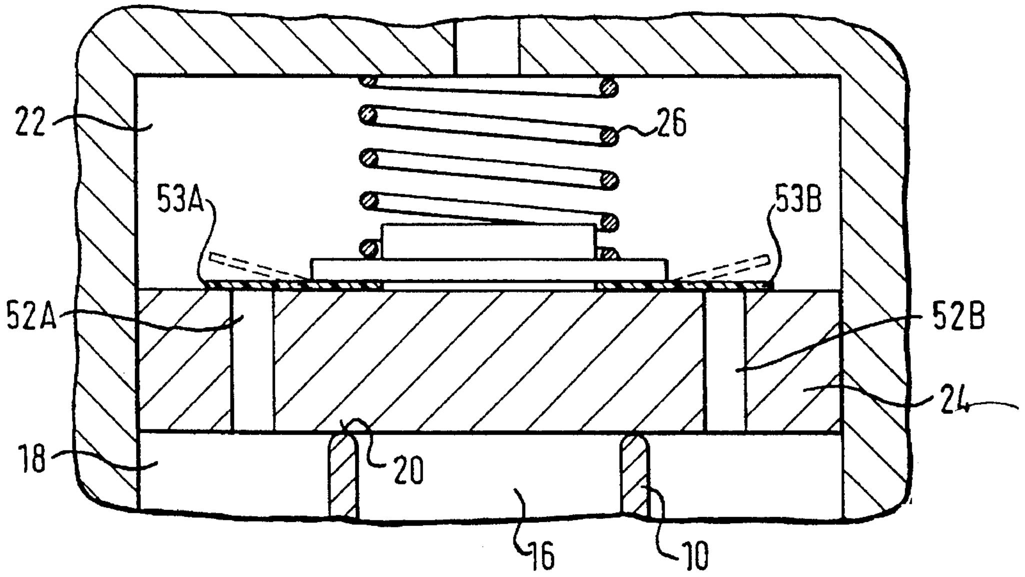
FIG. 2 shows a detailed view on a larger scale of a valve member in the form of a valve plate.

In the case of the modified embodiment illustrated in FIG. 2 the annular space 18 is connected with the inlet duct 14 and the outlet duct 16 is surrounded by the valve seat 20. Two pressure equalizing ducts 52A and 52B extend through the closure member 24 and are able to be respectively shut at the end thereof adjacent to the pressure equalizing space 22 by an elastic valve flap 53A and, respectively, 53B.

Figure 3:
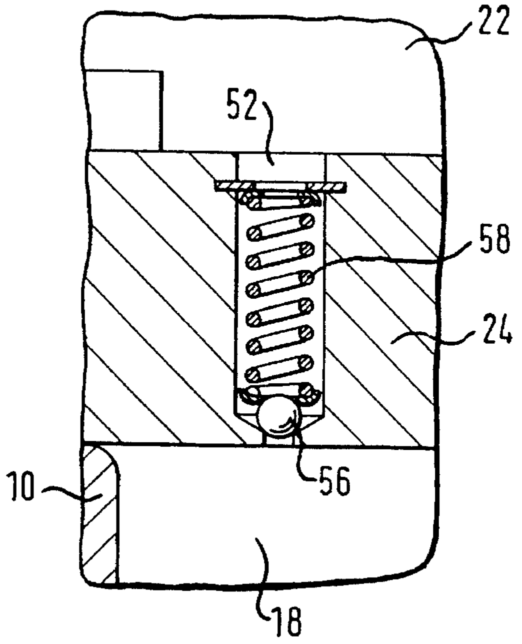
FIG. 3 is a detailed view of the pressure equalizing duct, extending through the valve closure member with the associated check valve.

As shown in FIG. 3 in the case of the design of FIG. 2 too each of the two check valves may be constituted by a ball valve in a manner similar to the embodiment of FIG. 1.

Figure 4:
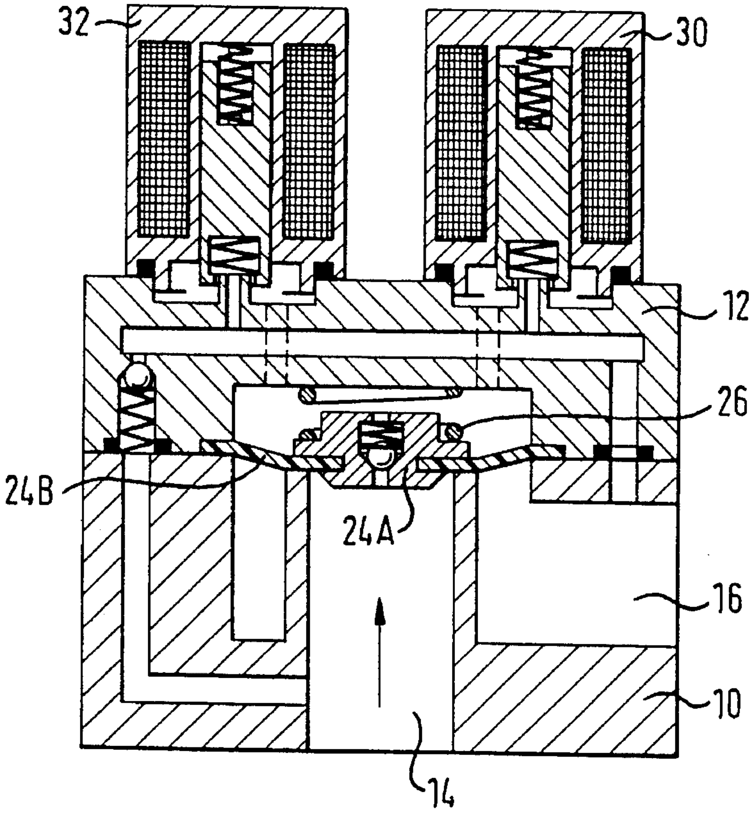
FIGS. 4 to 7 show diagrammatic views of several possible forms of valve embodiments.

FIG. 4 diagrammatically shows a modification of the design in accordance with FIG. 1. In this design the valve closure member consists of a rigid middle part 24A, against which the compression spring 26 bears, and an annular diaphragm 24B connected with it, whose outer periphery is clamped between the housing parts 10 and 12.

Figure 5:
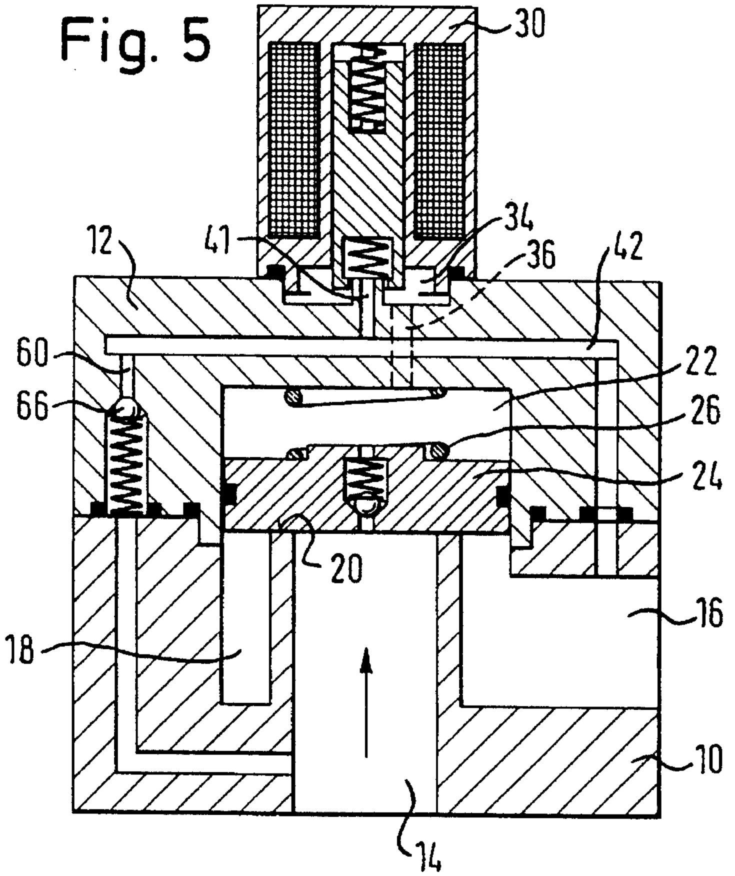
Figure 6:
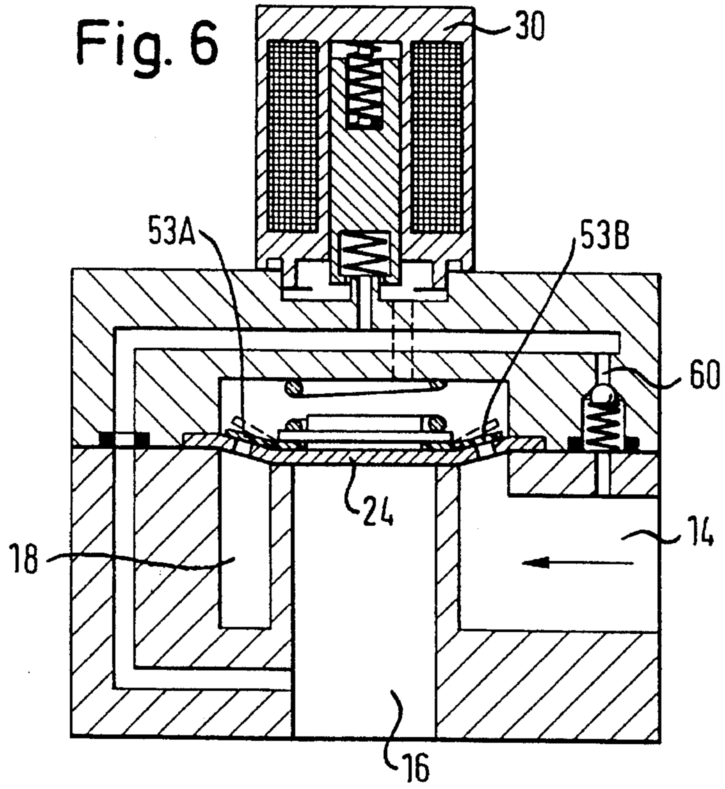
Figure 7:
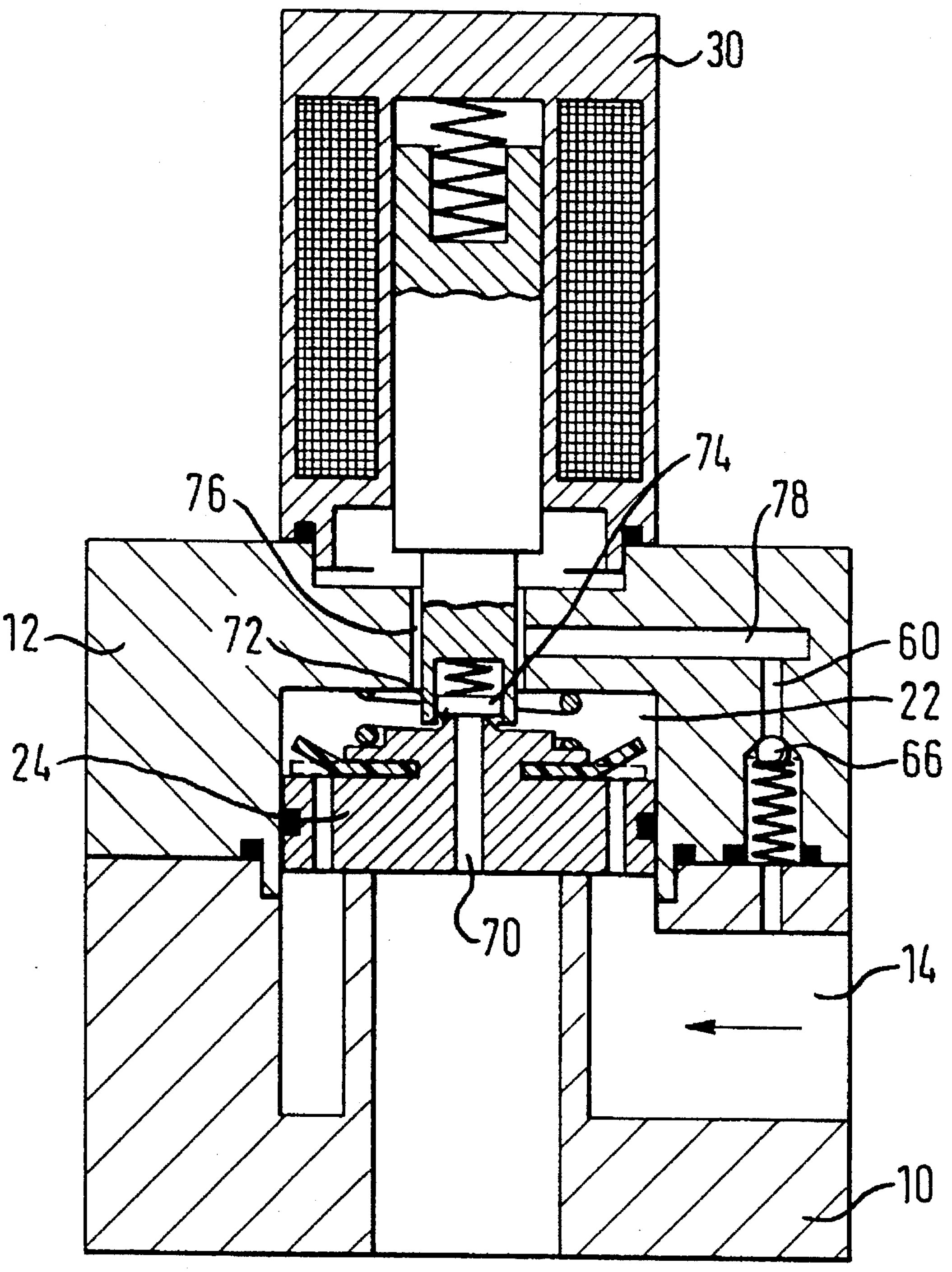

In the case of the embodiments of FIGS. 5 through 7 respectively only one pilot valve 30 is provided. This pilot valve 30 is preferably designed in the form of a stepless proportional solenoid valve so that fine metering of the fuel is possible with only one pilot valve.

As shown in FIG. 5 the closure member 24 consists of a rigid valve plate. Like the embodiment in accordance with FIG. 1 the annular duct 18 is connected with the outlet duct 16. From the control duct 42 there branches directly the relief duct 60, which is connected with a connecting duct in the housing part 10 via the excess pressure valve with the valve ball 66, said connecting duct opening into the inlet duct 14. The valve space 34 of the pilot valve 30 is connected via the connecting duct 36 with the pressure equalizing space 22 and surrounds a valve seat, at which a control hole 40, connected with the control duct 42, opens. In the case of this embodiment the metering of the fuel is controlled by pulse width modulation of the exciting current supplied to the solenoid of the pilot valve 30.

In the case of the embodiments illustrated in FIGS. 6 and 7 in each case the annular duct 18 is connected with the inlet duct 14. Furthermore the closure member 24 is constituted by a diaphragm, which is stiffened in its middle part by a rigid plate. The check valves are as in FIG. 2 constituted by elastic valve flaps 53A and 53B. The different ducts and holes are arranged and designed in a fashion similar to that of FIG. 5 but however the position of the excess pressure valve is altered, since the relief duct 60 is always to be connected with the inlet duct 14.

In the embodiment of FIG. 7 the closure member 24 is again designed in the form of a rigid valve plate in a manner similar to that of the design of FIG. 2. A particular feature of this design is that the flow path controlled by the pilot valve 30 has a control duct 70 extending coaxially through the closure member 24 and which at its end opening into the pressure equalizing space 22 is surrounded by an annular valve seat 72, with which the valve member 74 of the pilot valve 30 directly cooperates. The valve member 74 is surrounded by an annular valve space 76, from which a control duct 78 branches, which is connected with the inlet duct 14 by a relief duct 60, which is perpendicular to it and is under the control of an excess pressure valve having a valve ball 66.

In the case of this particularly simple design all control holes and ducts are arranged in the housing part 12 so that manufacture is simplified.

I claim:

1. A pilot controlled valve for fuel dispensers for motor vehicles, comprising a valve body in which an inlet duct, an outlet duct, an annular valve seat and an annular duct surrounding the valve seat are formed, a valve closure member, a compression spring urging said closure member toward engagement with said valve seat, said closure member, on a side thereof turned away from said valve seat, defining a pressure equalizing space connected by at least one pressure equalizing duct with said inlet duct to provide a flow connection, at least one pilot valve, by which a fluid flow through a separate flow path between said pressure equalizing space and said outlet duct may be controlled to thereby control movement of said valve closure member, and a check valve arranged in said pressure equalizing duct and adapted to close the same in a direction of flow from said pressure equalizing space to said inlet duct to avoid counter flow of metered fuel through said check valve.

2. The valve as claimed in claim 1, characterized in that the pressure equalizing duct (52) extends through the valve closure member (24).

3. The valve as claimed in claim 2, characterized in that the valve closure member (24) is constituted by a diaphragm (24B) held at an outer edge thereof in the valve body (10, 12) and having a rigid middle part (24A), against which the compression spring (26) bears.

4. The valve as claimed in claim 1 or claim 2, characterized by an excess pressure valve (66, 68) integrated in the valve body (10, 12) and adapted to open a flow connection to the inlet duct (14), when at the outlet side, defined by the valve closure member (24), of the valve a pressure obtains, which exceeds the pressure on the inlet side by a predetermined amount.

5. The valve as claimed in claim 4, characterized in that the excess pressure valve (66, 68) is arranged in a relief duct (60) leading to the inlet duct (14) and branching from the flow path (42) which is under the control of the pilot valve (30, 32).

6. The valve as claimed in claim 1, characterized in that the check valve (54, 56) is constituted by an annular sealing seat (54) surrounding an aperture opening of the pressure equalizing duct (52) on the pressure equalizing space (22) side and by a valve ball (56) urged by a compression spring (58) into engagement with the sealing seat (54).

7. The valve as claimed in claim 1, characterized in that the check valve is constituted by an annular sealing seat surrounding an aperture opening of the pressure equalizing duct (52) on the pressure equalizing space (22) side and by a valve flap (53A, 53B) held elastically against the sealing seat.

8. The valve as claimed in claim 1, characterized by a plurality of pressure equalizing ducts (52A, 52B), each having an associated check valve (53A, 53B), extending through the valve closure member (24).

9. The valve as claimed in claim 1, characterized in that the valve closure member (24) is constituted by a valve plate.

10. The valve as claimed in claim 1, characterized by two pilot valves (30, 32) adapted to control the flow connections (40, 46) of different bore size between the pressure equalizing space (22) and the outlet duct (16).

11. The valve as claimed in claim 1, characterized in that the valve body is constituted by first and second housing parts (10, 12) such first housing part (10) having the inlet duct (14), the outlet duct (16) and the annular duct (18) and such second housing part (12) containing the pressure equalizing chamber (22) and the flow path (42) controlled by the pilot valve (30, 32).

12. The valve as claimed in claim 11, characterized in that the second housing part (12) contains the excess pressure valve (66, 68).

13. The valve as claimed in claim 12, characterized in that the annular duct (18) is connected with the outlet duct (16), in that the flow path (42) under the control of the pilot valve (30, 32) is at least nearly completely formed in the second housing part (12), and in that the relief duct (60) branching from this flow path extends from the second housing part (12) through the first housing part (10) and as far as the inlet duct (16).

14. The valve as claimed in claim 12, characterized in that the annular duct (18) is connected with the inlet duct (14), in that the relief duct (60) branching from the flow path (42) under the control of the pilot valve (30, 32) is at least nearly completely formed in the second housing part (12), and in that this flow path extends from the second housing part (12) through the first housing part (10) and as far as the inlet duct (16).

15. The valve as claimed in claim 1, characterized in that the annular duct (18) is connected with the inlet duct (14), in that the flow path (70) under the control of the pilot valve (30) extends through the middle part of the valve closure member (24), and in that the aperture opening, arranged on the pressure equalizing space (22) side of this flow path (70) is surrounded by an annular sealing seat (72) of the pilot valve (30), with which its valve member (74) is adapted to directly cooperate.

16. The valve as claimed in claim 1, characterized in that the pilot valve is designed in the form of a stepless proportional solenoid valve.

* * * * *